US007811521B2

(12) United States Patent
Sando et al.

(10) Patent No.: US 7,811,521 B2
(45) Date of Patent: Oct. 12, 2010

(54) TESTING MICROCHIP AND TESTING APPARATUS USING THE SAME

(75) Inventors: Yasuhiro Sando, Amagasaki (JP); Akihisa Nakajima, Sagamihara (JP); Kusunoki Higashino, Osaka (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/385,525

(22) Filed: Mar. 21, 2006

(65) Prior Publication Data

US 2006/0216201 A1 Sep. 28, 2006

(30) Foreign Application Priority Data

Mar. 24, 2005 (JP) ............................ 2005-086682

(51) Int. Cl.
*B01L 3/02* (2006.01)
*G01N 21/00* (2006.01)
*E03B 1/00* (2006.01)
*G01N 1/10* (2006.01)

(52) U.S. Cl. .......................... 422/100; 422/58; 422/61; 422/73; 422/81; 422/82; 436/52; 436/53; 436/180; 137/1; 137/806; 137/807

(58) Field of Classification Search .................... 422/58
See application file for complete search history.

(56) References Cited

U.S. PATENT DOCUMENTS 5,587,128 A * 12/1996 Wilding et al. ................ 422/50
5,842,787 A * 12/1998 Kopf-Sill et al. ............ 366/340
5,958,344 A 9/1999 Levine et al.
6,149,787 A * 11/2000 Chow et al. ................. 204/451
6,197,595 B1 3/2001 Anderson et al.
6,235,471 B1 5/2001 Knapp et al.
6,306,659 B1 10/2001 Parce et al.
2004/0115838 A1 6/2004 Quake et al.

FOREIGN PATENT DOCUMENTS

WO WO 2004/061418 A 7/2004

* cited by examiner

*Primary Examiner*—Jill Warden
*Assistant Examiner*—Neil Turk
(74) *Attorney, Agent, or Firm*—Lucas & Mercanti, LLP

(57) ABSTRACT

A testing microchip includes a specimen storage section; a reagent storage section; a reaction section; a testing section for a test of a reaction product obtained from the reaction; a liquid feed control section; and a gas bubble trapping structure. The sections are connected continuously by a series of flow channels. The liquid feed control section stops passing of liquid until a liquid feeding pressure reaches a predetermined pressure, and passes the liquid when the liquid feeding pressure becomes higher than the predetermined pressure; and the gas bubble trapping structure traps a gas bubble in the liquid that flows in the flow channel so that the gas bubble does not flow to the downstream side and only the liquid passes to the downstream side. A testing apparatus that performs testing in the testing section of the testing microchip, wherein the testing microchip is attachably and detachably mounted to the apparatus.

5 Claims, 9 Drawing Sheets

FIG. 8 ( a )
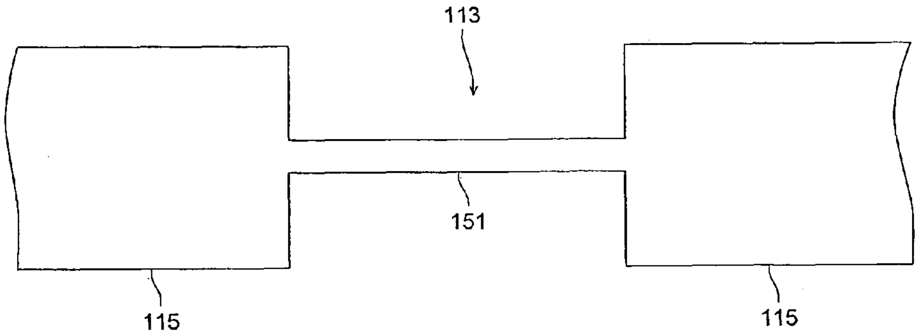
FIG. 8 ( b )
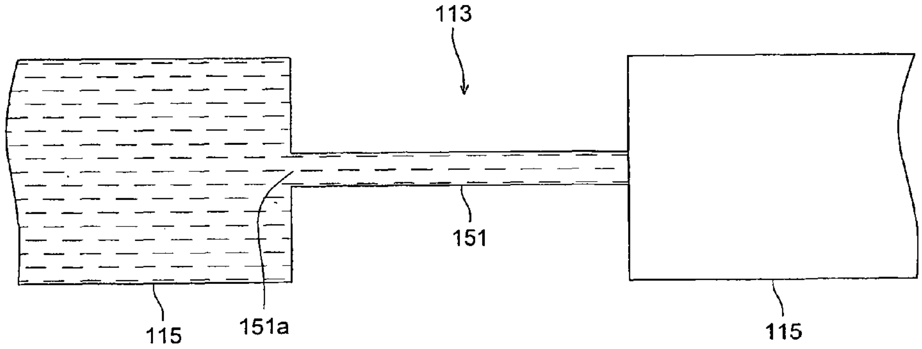

TESTING MICROCHIP AND TESTING APPARATUS USING THE SAME

This application is based on Japanese Patent Applications No. 2005-086682 filed on Mar. 24, 2005 in Japanese Patent Office, the entire contents of which are hereby incorporated by reference.

FIELD OF THE INVENTION

This invention relates to a testing microchip that can be used as a microreactor in genetic screening for example, and to a testing apparatuses this microchip.

BACKGROUND OF THE INVENTION

In recent years, using micro-machine technology and microscopic processing technology, systems are developed in which devices and means, for example, pumps, valves, flow channels, sensors and the like for performing conventional sample preparation, chemical analysis, chemical synthesis and the like are miniaturized and integrated on a single chip.

These systems are called μ-TAS (Micro Total Analysis System), bioreactor, lab-on-chips, and biochips, and much is expected of their application in the fields of medical testing and diagnosis, environmental measurement and agricultural manufacturing.

As seen in genetic screening in particular, in the case where complicated steps, skilful operations, and machinery operations are necessary, a microanalysis system, which is automatic, has high speed and is simple, is very beneficial not only in terms of reduction in cost, required amount of sample and required time, but also in terms of the fact that it makes analysis possible in cases where time and place cannot be selected.

At a site where various testing such as clinical testing is carried out, even in a case of measuring with a microreactor of a chip type which can quickly output results regardless of place, quantitation and accuracy in analysis are deemed to be important.

However, it is required to establish a reliable liquid feeding system with a simple structure, since there are severe limitation with respect to size and shape for an analysis chip such as a chip type microreactor. A micro liquid control device that has high accuracy and excellent reliability is needed. The inventors of the present invention have already proposed a suitable micropump system as a micro liquid control device which satisfies this requirement (Patent Document 1: Japanese Patent Application Laid-Open No. 2001-322099 Publication and Patent Document No. 2: Japanese Patent Application Laid-Open No. 2004-108285 Publication).

Furthermore, the inventors of the present invention have already proposed, in Patent Document 3 (Japanese Patent Application 2004-138959), a testing microchip (microreactor) including: a specimen storage section in which specimen is stored; a reagent storage in which reagent is stored; a reaction section which has a reaction flow channel in which the specimen stored in the specimen storage section and the reagent stored in the reagent storage section are merged to perform a predetermined reaction processing; and a testing section which has a testing channel for performing a predetermined test on the reaction-processed substance obtained from the reaction in the reaction section, wherein the specimen storage section, the reagent storage section, the reaction section, and the testing section are connected continuously by a series of flow channels from the upstream side to the downstream side on a single flow channel.

In the microreactor of Patent Document 3 (Japanese Patent Application No. 2004-138959), the flow channels have a number of liquid feed control sections 113 as shown in FIG. 8. This liquid feed control section 113 interrupts the passage of liquid until the feed pressure in the normal direction of flow, which is from upstream to downstream, reaches a predetermined pressure, and permits passage of the liquid by applying a feed pressure that is greater than or equal to the predetermined pressure.

That is to say, each liquid feed control section 113 includes a liquid feed control path (with a smaller flow channel diameter) 151 having a smaller cross-sectional flow area than the flow channels 115, through which the flow channel 115 on the upstream side (hereinafter, also referred to as "the upstream flow channel") and the flow channel 115 on the downstream side (hereinafter, also referred to as "the downstream flow channel") communicate with each other. Thus, liquid having reached the liquid feed control channel 151 is restricted from passing from the flow channel 115 on the upstream side to the other side.

Due to surface tension, a predetermined feed pressure is needed in order to expel liquid from the liquid feed control path end 151*a* which has a small cross-sectional area (small diameter) to the downstream flow channel which has a large cross-sectional area (large diameter). Thus, liquid feed control sections 113 are disposed at predetermined locations on the flow channels of the testing microchip, and by controlling the pump pressure from the micropump that is not shown, passing and stopping of the liquid is controlled.

Thus, it is possible for example to temporarily stop the movement of liquid at a predetermined location on a flow channel, and then resume feeding of the liquid to the downstream flow channel at a predetermined timing. Herein, if the inner surface of the liquid feed control path 151 is formed of a hydrophilic material, it is preferable that the inner surface of the liquid feed control path 151 is coated with a water repellent coating such as a fluorine based coating.

By providing a liquid feed control path 151 which allows an upstream flow channel 115 and a downstream flow channel 115 to communicate with each other and has a smaller cross-sectional flow area than the flow channels, feed timing can be controlled.

[Patent Document 1] Japanese Patent Application Laid-Open No. 2001-322099 Publication

[Patent Document No. 2] Japanese Patent Application Laid-Open No. 2004-108285 Publication

[Patent Document 3] Japanese Patent Application No. 2004-138959

[Non-Patent Document 1] "DNA Chip Technology and Applications" "Proteins, Nucleic Acids and Enzymes" Volume 43 Issue 13 (1998) Published by Fusao Kimizuka and Ikunoshin Kato, Kyoritsu Publishing Corp.

In such a known testing microchip, if gas bubbles are present in the liquid, as shown in FIG. 9, gas bubbles K are collected at a liquid flow path entrance 115*a* that connects an upstream flow channel 115 with a larger diameter and a liquid feed control channel 151 with a smaller diameter, and a liquid flow path entrance 115*a* is blocked.

Accordingly, a micropump pressure not lower than a set pressure is needed in order to pass liquid from the upstream flow channel 115 with a large diameter, via the liquid feed control path 151 with a small diameter, to the downstream flow channel 115 with a large diameter, and accurate liquid feed control becomes impossible.

Thus, it is possible, for example, that a predetermined testing may not be performed accurately because the specimen and the reagent are not mixed at a suitable time or they are not mixed in a predetermined mixing ratio, resulting in no reaction.

Furthermore, a gas bubble K that blocks the flow path entrance 115*a* may flow all at once from the upstream channel 115 with a large diameter to the downstream flow channel 115 with a large diameter via the liquid feed control path 151 with a small diameter, and bonding of the reagent, such as a biotin modified chimera primer for specific hybridization of the gene to be an object of detection, and a specimen is inhibited due to the effect of the gas bubbles and the appropriate testing cannot be performed at the testing section.

The present invention was conceived in view of this situation, and the object thereof is to provide a testing microchip and a testing apparatus in which this testing microchip is used. At a liquid feed control section disposed in a flow channel of the testing microchip, gas bubbles which come from an upstream liquid flow channel do not collect at a flow path entrance which leads to a liquid feed control path with a small diameter nor block the flow path entrance; the passage of liquid can be temporarily stopped and then resumed at a predetermined pressure at an appropriate time. It is possible to stop the liquid flow once and pass the liquid at a predetermined pressure and at a suitable timing, while preventing the gas bubbles from passing downstream. Thus, the accuracy of the liquid feed control section is high and accurate testing can be performed with the reliable testing microchip and the testing apparatus using the microchip.

SUMMARY OF THE INVENTION

In an aspect in accordance with the invention, there is provided a testing microchip including: a specimen storage section that stores a specimen; a reagent storage section that stores a reagent; a reaction section having a reaction flow channel for mixing the specimen stored in the specimen storage section and the reagent stored in the reagent storage section and performing a predetermined reaction processing; a testing section having a testing flow channel for performing a predetermined test of a reaction product obtained from the reaction in the reaction section; a liquid feed control section; and a gas bubble trapping structure. Herein, the specimen storage section, the reagent storage section, the reaction section, and the testing section are connected continuously by a series of flow channels from an upstream side to a downstream side; the liquid feed control section is provided for the series of the flow channels, stops passing liquid until a liquid feeding pressure in a normal direction from the upstream side to the downstream side reaches a predetermined pressure, and passes the liquid when the liquid feeding pressure becomes higher than the predetermined pressure; and the gas bubble trapping structure is provided at the liquid feed control section and traps a gas bubble in the liquid that flows in the flow channel so that the gas bubble does not flow to the downstream side and only the liquid passes to the downstream side.

In another aspect in accordance with the invention, there is provided a testing apparatus that performs a test in the testing section of the testing microchip, described above, wherein the testing microchip is attachably and detachably mounted to the apparatus.

BRIEF DESCRIPTION OF THE DRAWINGS

FIG. 8 is a schematic top view of a liquid feed control section of a known testing microchip.

DETAILED DESCRIPTION OF THE PREFERRED EMBODIMENT

Figure 1:
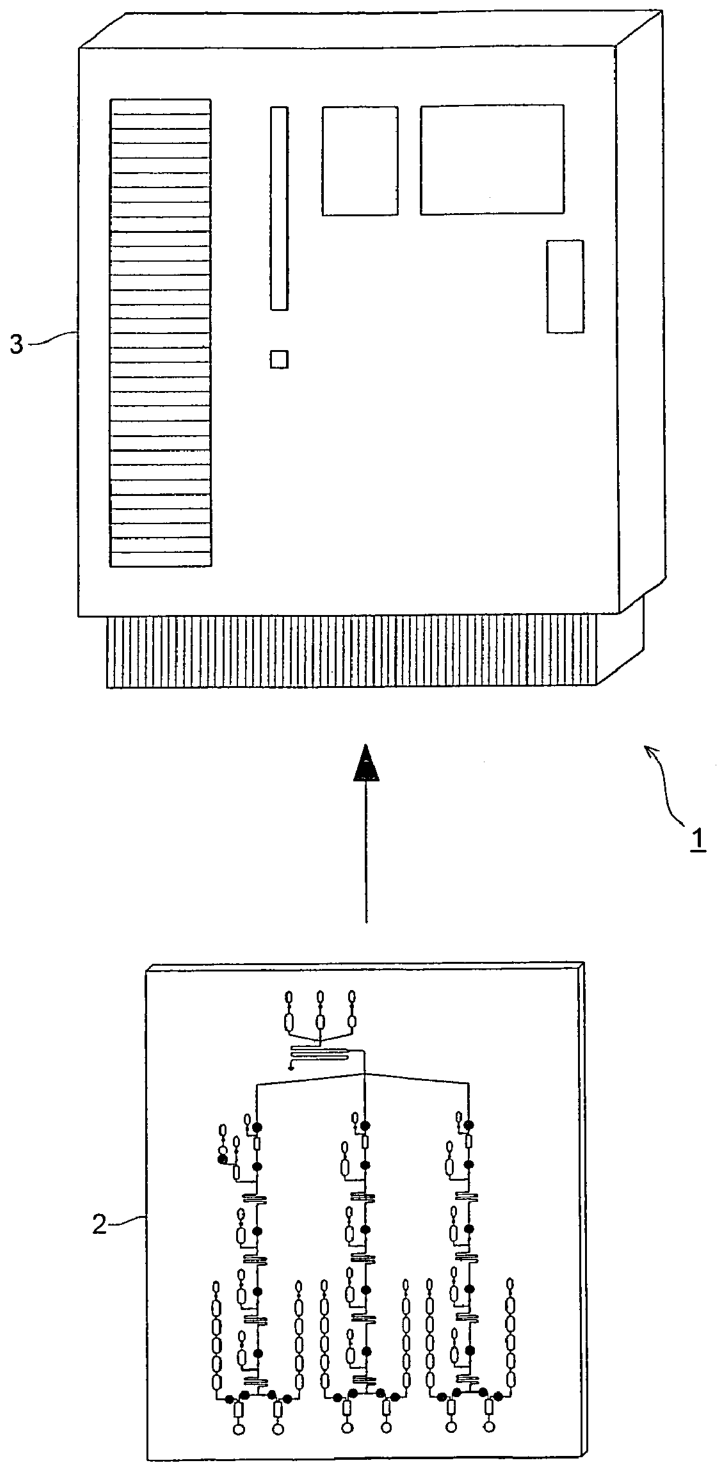
FIG. 1 is a perspective view of a testing apparatus which includes a testing microchip and a testing apparatus main body in which the testing microchip is attachably and detachably mounted, in an embodiment in accordance with the invention.

The invention includes the following structures.

Item 1

A testing microchip, including: a specimen storage section that stores a specimen; a reagent storage section that stores a reagent; a reaction section having a reaction flow channel for mixing the specimen stored in the specimen storage section and the reagent stored in the reagent storage section and performing a predetermined reaction processing; a testing section having a testing flow channel for performing a predetermined test of a reaction product obtained from the reaction in the reaction section; a liquid feed control section; and a gas bubble trapping structure.

Herein, the specimen storage section, the reagent storage section, the reaction section, and the testing section are connected continuously by a series of flow channels from an upstream side to a downstream side; the liquid feed control section is provided for the series of the flow channels, stops passing liquid until a liquid feeding pressure in a normal direction from the upstream side to the downstream side reaches a predetermined pressure, and passes the liquid when the liquid feeding pressure becomes higher than the predetermined pressure; and the gas bubble trapping structure is provided at the liquid feed control section and traps a gas bubble in the liquid that flows in the flow channel so that the gas bubble does not flow to the downstream side and only the liquid passes to the downstream side.

With this structure, the gas bubbles in the liquid flowing in the flow channel are trapped, so as not to flow downstream, by the gas bubble trapping structure of the liquid feed control section that is arranged in the flow channel. Thus, the gas bubbles never flow in the large diameter downstream flow channel, and reaction of the reagent and the specimen, for example, is not inhibited by the effect of gas bubbles, and thus the desired testing can be accurately performed in the testing section.

Since it is allowed to pass liquid only, by applying a feed pressure which is not less than a predetermined value using the gas bubble trapping structure of the liquid feed control section formed in the flow channel, the movement of liquid may be temporarily stopped and then fed to the downstream flow channel at a predetermined timing, and thus stoppage and passage of the liquid can be accurately controlled.

Thus, the specimen and the reagent, for example, are mixed at appropriate times and at a predetermined mixing ratio to react with each other, and a testing microchip is provided in which the accuracy of the liquid feed control section is high, accurate testing is performed and excellent reliability is obtained.

Item 2

The testing microchip of Item 1, wherein the liquid feed control section includes a liquid feed control path through which a flow channel on the upstream side and a flow channel on the downstream side communicate with each other, and the liquid feed control path has a smaller cross-sectional flow area than these flow channels.

With this structure, because of surface tension, a predetermined feed pressure is needed in order to expel liquid from the liquid feed control path which has a small cross-sectional area (small diameter) to the flow channel with a large cross-sectional flow area (large diameter) on the downstream side. Thus, each liquid feed control section is disposed at a predetermined location on a flow channel of the testing microchip, and by controlling the pump pressure from a micropump, passage and stoppage of liquid is controlled, and feeding timing is controlled.

Thus, a specimen and a reagent, for example, are mixed at an appropriate time and at a predetermined mixing ratio to react with each other, and a predetermined testing can be accurately performed.

Item 3

The testing microchip of Item 2, wherein the gas bubble trapping structure is disposed between the liquid feed control path and the flow channel on the upstream side, and includes a buffer path having a larger cross-sectional area than the cross-sectional area of the liquid feed control path.

With this structure, since a buffer path which has a larger cross-sectional area than the cross-sectional area of the liquid feed control path is provided between the liquid feed control path and the upstream flow channel, even if gas bubbles that are in the liquid flowing in the upstream flow channel collect at the downstream end of it, the gas bubbles are trapped at the entrance of the buffer path, and furthermore, since the buffer path has a large cross-sectional area, a flow channel for the liquid around the gas bubbles is secured.

Thus, the liquid in the upstream flow channel can flow into the downstream flow channel via the feed control path at a predetermined pressure, and by controlling the pump pressure from the micropump, stopping and passing of the liquid is controlled to control the timing of feeding the liquid.

Thus, the specimen and the reagent, for example, are mixed at an appropriate time and at a predetermined mixing ratio to react with each other, and a predetermined testing can be accurately performed.

Furthermore, even if the gas bubbles included in the liquid that flows in the upstream flow channel collect at the downstream end of it, since the gas bubbles are trapped at the entrance of the buffer path, the gas bubbles never flow into the large diameter flow channel all at once. As a result, reaction of the reagent and the specimen is not inhibited by the effect of gas bubbles, and thus the desired testing can be accurately performed in the testing section.

Item 4

The testing microchip of Item 3, wherein the buffer path has a width that is approximately the same as a width of the flow channel on the upstream side.

With this a structure, since the buffer path that is provided between the liquid feed control path and the upstream flow channel has substantially the same width as that of the upstream flow channel, a liquid flow channel is secured at the periphery of the bubbles having been trapped at the entrance of the buffer path, in other words, secured at both end portions, in the lateral direction, of the buffer path.

Thus, the liquid in the upstream flow channel can flow to the downstream flow channel via the liquid feed control path at a predetermined pressure, and by controlling the pump pressure from the micropump, stopping and passing of liquid is controlled to thereby control feed timing.

Accordingly, for example, the specimen and the reagent are mixed at an appropriate time and at a predetermined mixing ratio to react with each other, and predetermined testing can be accurately performed.

Item 5

The testing microchip of Item 3, wherein the buffer path has a depth smaller than a depth of the flow channel on the upstream side.

With this structure, because the buffer path has a smaller depth than that of the upstream flow channel, even if the gas bubbles included in the liquid that flows in the upstream flow channel collect at the downstream end of the upstream flow channel, trapping of the bubbles at the buffer path entrance is further secured, and so the gas bubbles never flow into the large diameter flow channel all at once. Accordingly, reaction of the reagent and the specimen is not inhibited by the effect of gas bubbles, and thus the desired testing can be accurately performed at the testing section.

Item 6

The testing microchip of Item 1, wherein the specimen storage section includes a specimen pre-processing section that mixes specimen and a specimen pre-processing liquid and performs a specimen pre-processing.

With this structure, pre-processing appropriate for the amplification reaction of the specimen, such as separation and condensation of the object of analysis (analyte) or protein removal, can be carried out, and a testing microchip can be provided in which predetermined testing can be performed efficiently and quickly.

Item 7

A testing apparatus that performs a test in the testing section of the testing microchip of Item 1, wherein the testing microchip is attachably and detachably mounted to the apparatus.

With this structure, a predetermined testing can be performed accurately and quickly by simply mounting a testing microchip which is portable and has excellent handling properties, to a testing apparatus, without the need to use special techniques or performing difficult and complex operations.

Effects of the Invention

In accordance with the invention, the gas bubbles in the liquid that flows in the flow channel are trapped, so as not to flow downstream, by the gas bubble trapping structure of the liquid feed control section that is arranged in the flow channel. Thus, gas bubbles never enter the large diameter downstream flow channel, and accordingly, for example, reaction of the reagent and the specimen is not inhibited by the effect of gas bubbles, and thus a desired testing can be performed accurately at the testing section.

Also, because of the gas bubble trapping structure of the liquid feed control section that is arranged in the flow channel, only liquid is permitted to pass by applying a feed pressure that is not lower than a predetermined value, and thus movement of liquid can be temporarily stopped, and then feeding to the downstream flow channel can be resumed at a predetermined timing thus to control stopping and passing of the liquid accurately.

In this way, the specimen and the reagent, for example, are mixed at an appropriate time and at a predetermined mixing ratio to react with each other, and a testing microchip is provided, by which the accuracy of the liquid feed control section is high, accurate testing is performed and reliability is excellent.

In accordance with the invention, predetermined testing can be performed accurately and quickly by simply mounting a testing microchip which is portable and has excellent handling properties to a testing apparatus, without the need to use special techniques or performing difficult and complex operations.

Preferred Embodiment

The following is detailed description of a preferred embodiment in accordance with the invention with reference to the drawings.

Figure 2:
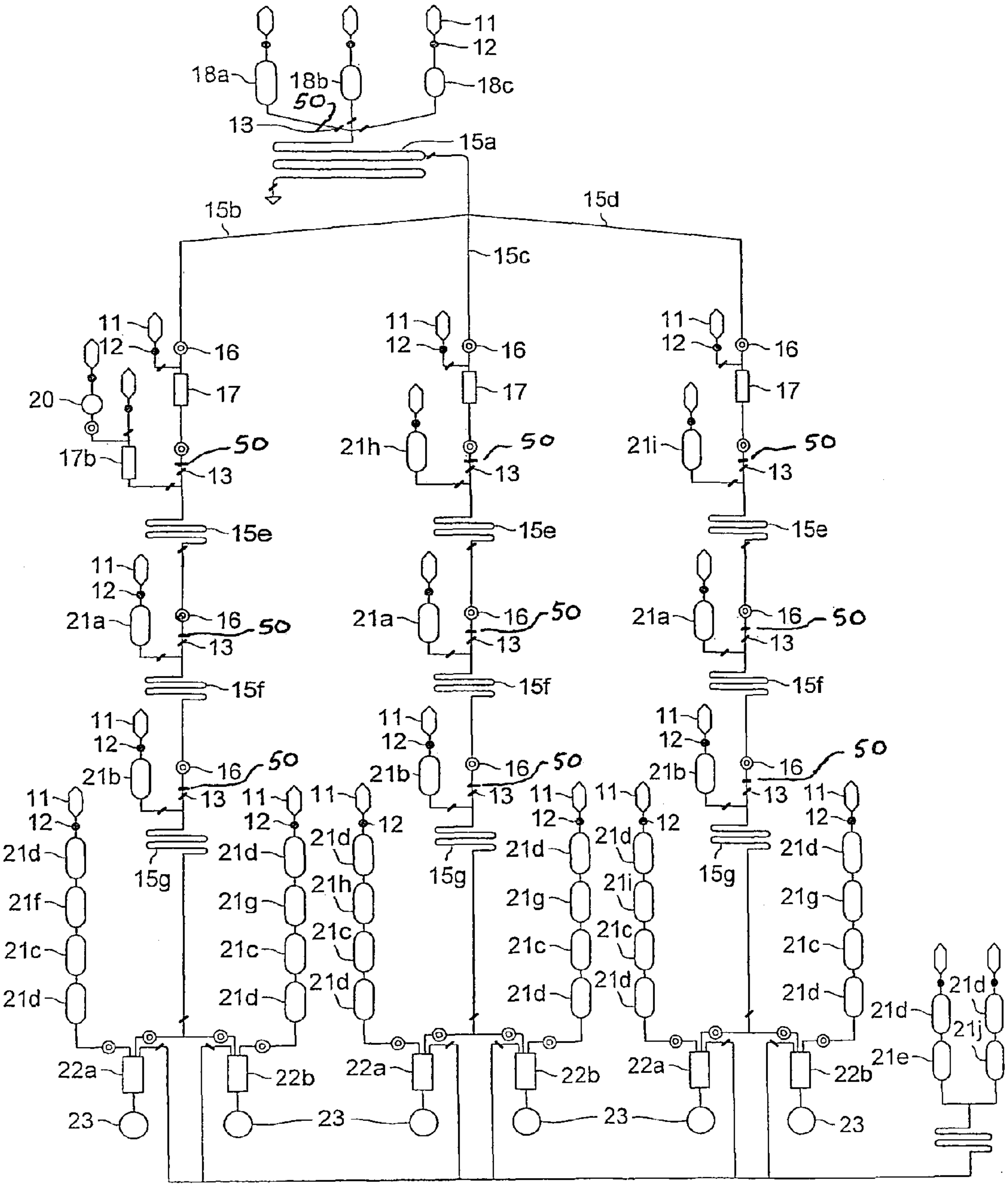
FIG. 2 is a top view showing only the entire flow channels formed in the testing microchip in FIG. 1.
Figure 3:
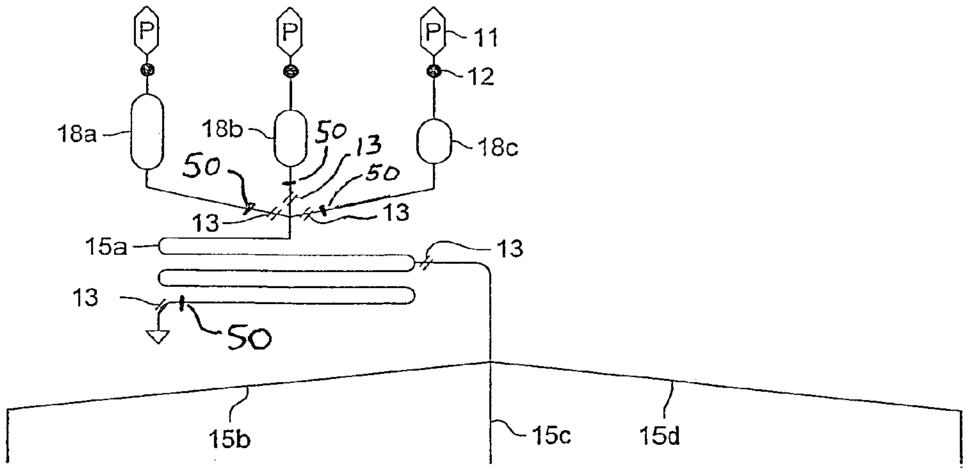
FIG. 3 is a partial enlarged view of a reagent storage section of flow channels shown in FIG. 2.
Figure 4:
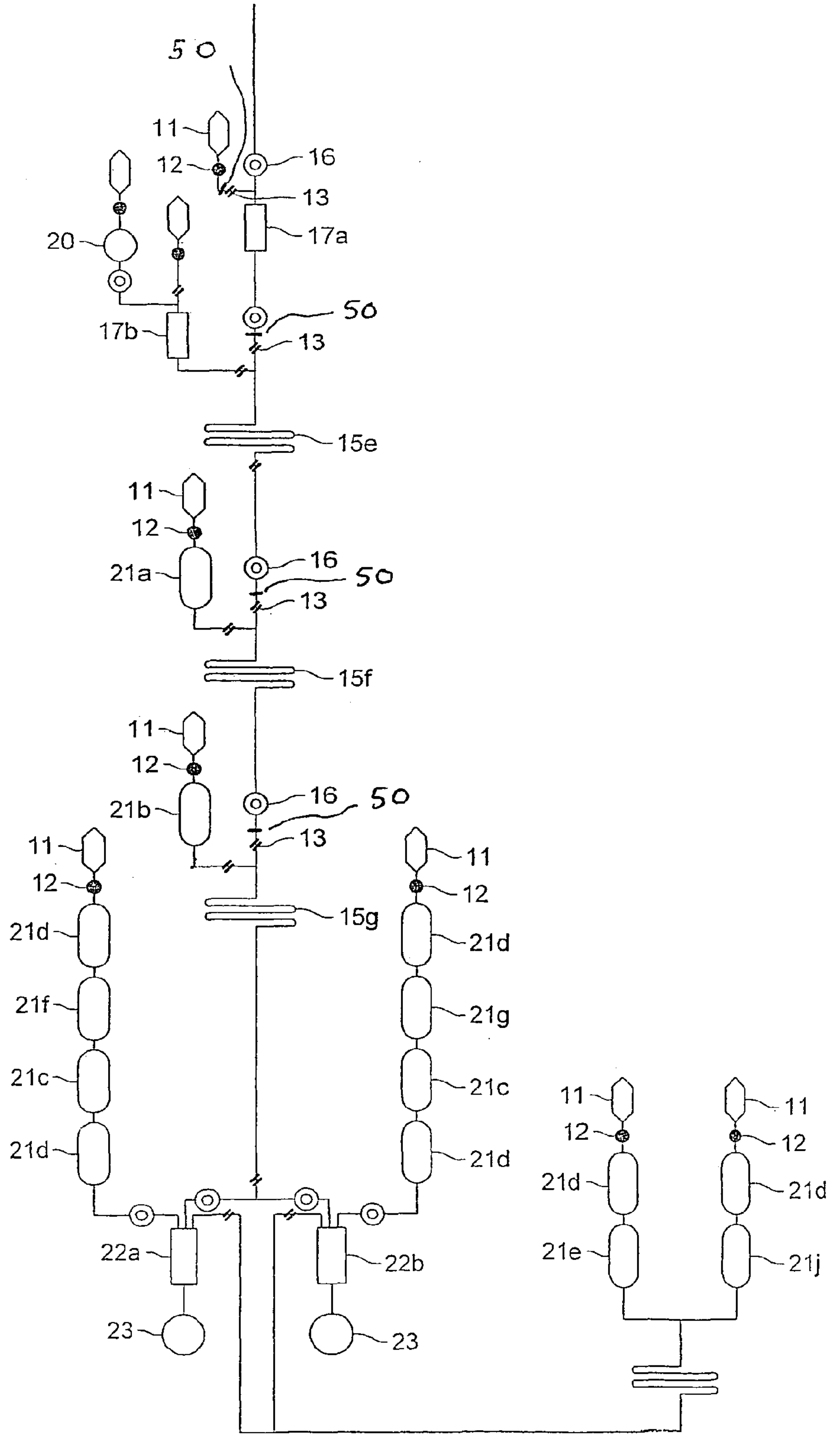
FIG. 4 is a partial enlarged view of an entire flow channel branching from the reagent storage section in FIG. 2.

FIG. 1 is a perspective view of a testing apparatus in an embodiment of the invention which includes a testing microchip in accordance with the invention and the testing apparatus main body in which the testing microchip is attachably and detachably mounted. FIG. 2 is a top view showing only the entire flow channels formed in the testing microchip in FIG. 1. FIG. 3 is a partial enlarged view of a reagent storage portion of the flow channels shown in FIG. 2. FIG. 4 is a partial enlarged view of all the flow channels branching from the reagent storage section in FIG. 2.

FIG. 1 shows the entire testing apparatus 1 in accordance with the invention, and the testing apparatus 1 includes a testing microchip 2 and a testing apparatus main body 3 in which the testing microchip 2 is attachably and detachably mounted and predetermined testing is performed.

As shown in FIG. 1, the testing microchip 2 is a rectangular-shaped card-like object, and is formed of a single chip made of resin, glass, silicon, ceramics or the like.

A series of flow channels are formed in the testing microchip 2, as shown in FIG. 2.

In the following description, the testing microchip 2 is one for genetic screening. However, the testing microchip 2 is not limited to this example, and may be used for screening various specimens. In addition, the arrangement, shape, dimensions, size and the like of the flow channel structure described in the following, may be subjected to various modifications, depending on the type and item of testing.

That is to say, the testing microchip 2 in the present embodiment is one in which an amplification reaction is carried out using ICAN (isothermal chimera primer initiated nucleic acid amplification) method, and a gene amplification reaction is carried out in the testing microchip 2 using a specimen extracted from blood or sputum, a reagent including biotin modified chimera primer for specific hybridization of the gene to be detected, a DNA polymerase having chain substitution activity and an endonuclease. (See Japanese Patent No. 3433929)

The reaction solution is fed into a flow channel in which streptavidin is adsorbed after the modification process, and the amplified gene is fixed in the flow channel.

Next, the probe DNA whose end has been modified by fluorescein isothiocyanate (FITC) and the fixed gene are hybridized. The gold colloid whose surface has been modified with a FITC antibody is adsorbed to the probe that has been hybridized with the fixed gene and the amplified gene is detected by optically measuring the concentration of the gold colloid.

The testing microchip 2, shown in FIG. 1, is a single chip made of resin. Gene amplification reaction and detection thereof are automatically performed in the testing microchip 2 by introducing a sample of blood or the like, and genetic diagnosis for multiple items can be performed simultaneously.

For example, by just dropping about 2-3 μl of blood specimen in a chip having a length and width of a few centimeters and by mounting the testing microchip 2 on the testing apparatus main body 3 of FIG. 1, the amplification reaction and detection thereof can be done.

As shown in FIG. 2, the testing microchip 2 has a reagent storage sections 18*a*, 18*b*, 18*c* that is used for gene amplification reaction.

That is to say, as shown in FIG. 3, reagents, such as biotin modified chimera primer for specific hybridization of the gene to be an object of detection, a DNA polymerase having chain substitution activity and an endonuclease, are stored in the reagent storage sections 18*a*, 18*b* and 18*c*.

In this case, it is preferable that the reagents are stored in advance in these reagent storage sections 18*a*, 18*b* and 18*c* such that testing can be done quickly regardless time and place. The surfaces of the reagent storage sections 18*a*, 18*b* and 18*c* are sealed in order to prevent evaporation, leakage, mixing of gas bubbles, contamination, and denaturing of the reagents which are stored in the testing microchip 2.

Furthermore, when the testing microchip 2 is stored, the reagent storage sections 18*a*, 18*b*, and 18*c* are preferably sealed by a sealing member to prevent the reagents from leaking therefrom into the micro flow channels and causing reaction. Preferably, the sealing member is in a solid or gel state in refrigeration conditions, and dissolves into a liquid state when the microchip 2 is brought to room temperature conditions. For example; the sealing member can be oil.

A micropump 11 is connected at the upstream side of each of the reagent storage sections 18*a*, 18*b* and 18*c* by a pump connection portion 12. Reagent is fed to the downstream flow channel 15*a* from the reagent storage sections 18*a*, 18*b* and 18*c* by the micropump 11.

Micropumps 11 are incorporated into the testing apparatus main body 3 which is separate from the testing microchip 2, and by mounting the testing microchip 2 to the testing apparatus main body 3, the micropumps 11 are connected through the pump connection portions 12 to the testing microchip 2. However, the micropumps 11 may be incorporated in advance into the testing microchip 2.

Figure 5:
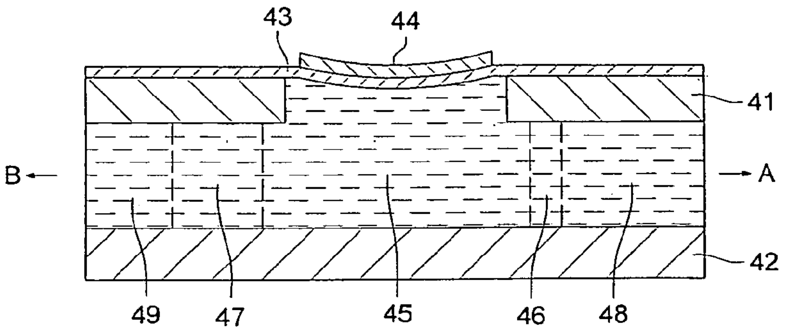
FIG. 5A is a cross-section showing an example of a micropump 11 which uses a piezopump.
FIG. 5B is a top view thereof.
FIG. 5C is a cross-sectional view of another example of a micropump 11.
Figure 5:
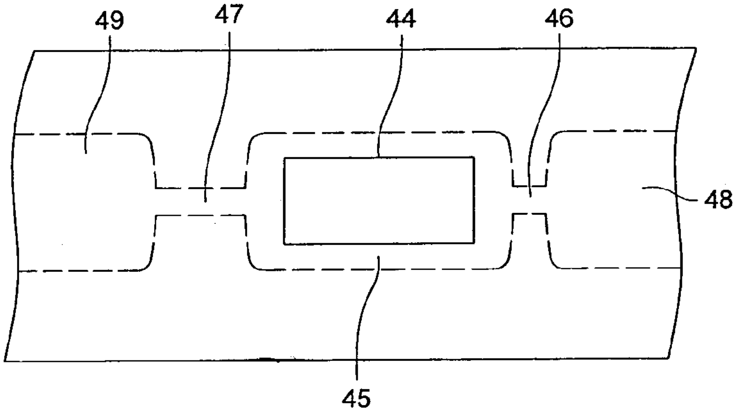
Figure 5:
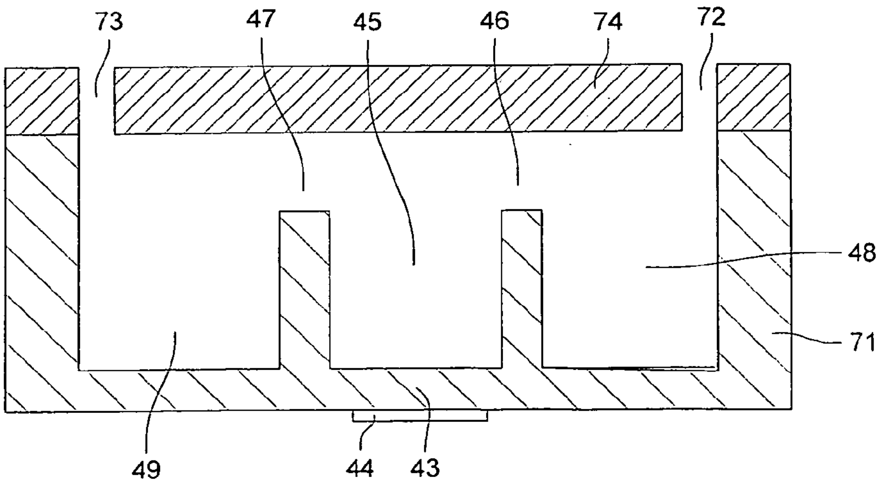

A piezo pump is preferably used as a micropump 11. FIG. 5A is a cross-sectional view of an example of the micropump 11 which uses a piezo pump and FIG. 5B is a top view thereof.

A micropump 11 includes: a first liquid chamber 48, a first flow channel 46, a pressure chamber 45, a second flow channel 47, and a substrate 42 formed with a second liquid chamber 49. Further, there are provided an upper substrate 41 which is laminated on the substrate 42, a vibration plate 43 which is laminated on the upper substrate 41, a pressure chamber 45 of the vibration plate 43, a piezoelectric element 44 which is laminated on the opposite side; of the vibration plate 43, to the pressure chamber 45, and a drive section (not shown) for driving the piezoelectric element 44.

FIG. 5C is a cross-sectional view showing another working example of a micropump 11. In this example, the micropump 11 includes a silicon substrate 71, a piezoelectric element 44, and a flexible wire, not shown. The silicon substrate 71 is made by processing a silicon wafer into a predetermined shape by known photolithography techniques, and the pressure chamber 45, the vibration plate 43, the first flow channel 46, the first liquid chamber 48, the second flow channel 47 and the second liquid chamber 49 are formed by etching. The first liquid chamber 48 has a port 72 while the second liquid chamber 49 has a port 73 and the liquid chambers communicate with the pump connection section 12 of the testing microchip 2 via these ports.

In a micropump 11 configured as described above, by changing the drive voltage and frequency of the pump, the feed direction and feeding speed of the liquid can be controlled.

As shown in FIG. 3, in the micropumps 11 configured as described above, reagent is fed from the reagent storage sections 18*a*, 18*b* and 18*c* to the downstream flow channel 15*a* via the liquid feed control section 13 and after reaching a stable mixed state in the flow channel 15*a*, the reagent mixture is fed to the three branched flow channels 15*b*, 15*d* and 15*c*.

That is to say, the flow channel 15*b* communicates with a specimen reaction and detection system including the channel on the left side, shown in FIG. 2. In addition, the flow channel 15*c* communicates with a positive control reaction and detection system including the middle flow channels, shown in FIG. 2. Further, a flow channel 15*d* communicates with a negative control reaction and detection system including the right flow channels, shown in FIG. 2.

The following mainly describes the flow channel 15*b* with reference to FIGS. 2 and 4.

Figure 6:
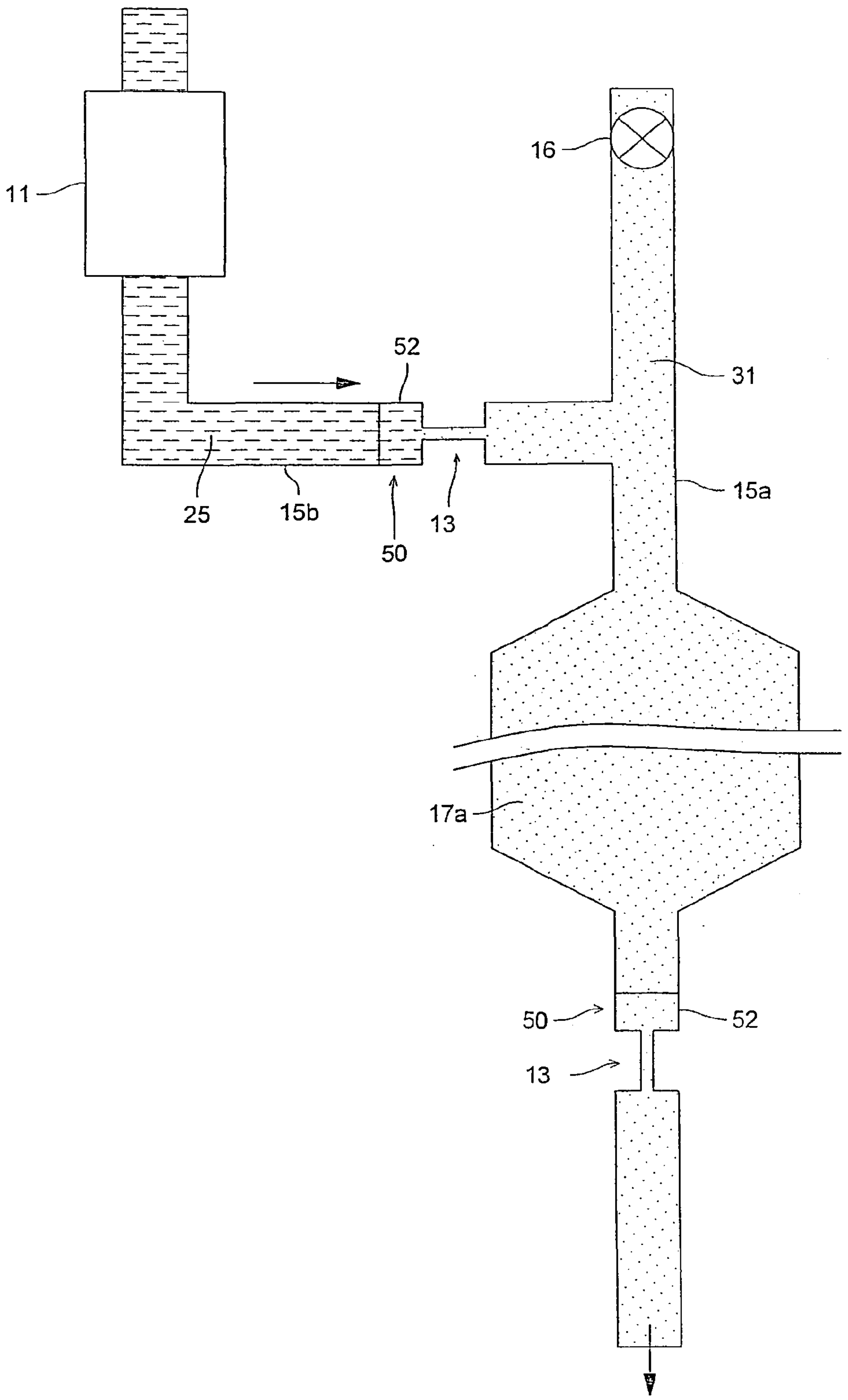
FIG. 6 is a schematic top view showing the structure of a reagent quantitation section.

The reagent mixture liquid that is fed into the flow channel 15*b* is then loaded into a reservoir section 17*a*, as shown in FIG. 4. Herein, as shown in FIG. 6, a reagent loading flow channel is formed between an upstream reverse flow prevention section (check valve) 16 on the upstream side of the reservoir section 17*a* and a downstream liquid feed control section 13. The reagent loading flow channel and a liquid feed control section 13, which is provided on a branch flow channel that communicates with a micropump 11 that feeds a drive liquid, form a reagent quantitation section.

That is to say, as shown in FIG. 6, at the reagent quantitation section, a predetermined amount of reagent mixture liquid is loaded into the flow channel (reagent loading flow channel 15*a*) between the reverse flow prevention section 16 including a check valve and the liquid feed control section 13 immediately downstream of reservoir section 17*a*. A branched flow channel 15*b* branches from the reagent loading flow channel 15*a* and communicates with the micropump 11 which feeds the drive liquid.

Feeding of fixed quantities of reagent is performed as follows. First, a reagent 31 is loaded by being supplied to the reagent loading flow channel 15*a* at a feed pressure that does not allow the reagent 31 to pass further than the liquid feed control section 13 immediately downstream of reservoir section 17*a*, from the side of the reverse flow protection section 16.

Next, by feeding a drive liquid 25 in the direction of the reagent loading flow channel 15*a* from the branched flow channel 15*b* using the micropump 11 at a feed pressure that allows the reagent 31 to pass further than the liquid feed control section 13 immediately downstream of reservoir section 17*a*, the reagent 31 that has been loaded in the reagent loading flow channel 15*a* is pushed further than the liquid feed control section 13 immediately downstream of reservoir section 17*a*, and thus-a fixed quantity of the reagent 31 is fed. Herein, by providing a large capacity reservoir section 17*a* in the reagent loading flow channel 15*a*, variation in the quantitation is reduced.

On the other hand, as shown in FIG. 4, a specimen extracted from blood or sputum is introduced from the specimen storage section 20 and loaded into the loading section 17*b*. Herein, the specimen storage section 20 may include a specimen pre-processing section, not shown, in which the specimen is mixed with specimen pre-processing solution to perform specimen pre-processing.

Also, the specimen storage section 20 has substantially the same mechanism as the reagent quantitation section mentioned above and a fixed quantity of specimen is loaded by the micropump 11, and a fixed quantity is fed to the successive flow channel 15*e*.

That is to say, the specimen loaded in the reservoir section 17*b*, and the reagent mixture liquid loaded in the reservoir section 17*a* are fed to the flow channel 15*e* via a Y-shaped flow channel, and mixing and the ICAN reaction are performed in the flow channel 15*e*.

Herein, the specimen and the reagents are fed, for example, by alternately driving each micropump 11 and alternately introducing the specimen and reagent mixed liquid in slices to the flow channel 15*e* and, preferably, the specimen and the reagents are quickly dispersed and mixed.

As shown in FIG. 4, the reaction stop solution is stored in advance in the stop solution storage section 21*a*, and the reaction stop solution is fed into the flow channel 15*f* by the micropump 11, and after performing amplification reaction using the biotin modified primer, the amplification reaction is stopped by mixing the reaction liquid and the stop solution.

Next, as shown in FIG. 4, a denaturant stored in a denaturant storage section 21*b* and the mixture having been subjected to the reaction stop process are mixed in the flow channel 15*g*, and the amplified genes are denatured into single strands. Subsequently, the obtained processing solution is transported, dividedly into two detection sections 22*a* and 22*b* which are for target substance detection and internal control detection. Thus, genes that have been denatured into single strands are fixed in the detection sections 22*a* and 22*b* by streptavidin adsorbed in the detection sections 22*a* and 22*b*.

Rinsing solution stored in rinsing solution storage sections 21*d* is fed to the detection sections 22*a* and 22*b* and rinsing is performed. Then, buffer stored in hybridization buffer storage sections 21*c* and probe DNAs, which are stored in a probe DNA storage section 21*f* (internal control probe DNA storage section 21*g* for internal control) and whose end have been subjected to fluorescent marking with FITC, are fed to detection sections 22*a* and 22*b*, and the probe DNAs are hybridized with the single gene strands that are fixed in the detection sections 22*a* and 22*b*. Herein, in the step prior to fixing the single strands of the amplified genes in the detection sections 22*a* and 22*b*, the probe DNAs may be hybridized to the single strands of the amplified genes.

Next, after the detection sections 22*a* and 22*b* are rinsed with rinsing solution, the gold colloid solution marked with a FITC antibody is fed from the gold colloid storage section 21*e* to the detection sections 22*a* and 22*b*, and thus gold colloid is bound to the fixed amplified genes via the FITC. The bound gold colloid is irradiated with a measuring beam from a LED, for example, and a determination is made as to whether there was amplification, or the efficiency of amplification is measured by detecting transmitted beams or reflected beams using an optical detection means such as photodiode or a photomultiplier.

Herein, as shown in FIG. 2 and FIG. 3, the flow channel 15*c* communicates with the positive control reaction and detection system constructing the central flow channel in FIG. 2, and the flow channel 15*d* communicates with the negative control reaction and detection system constructing the flow channel on the right side of FIG. 2. By feeding the reagent mixed liquid to the flow channels 15*c* and 15*d* and, as in the case of the above-described specimen reaction and detection system in the flow channel 15*b*, after amplification reaction is performed with the reagents in the flow channel, hybridization is performed with the probe DNA stored in the probe DNA storage section in the flow channel, and amplification reaction is detected based on the reaction products.

As shown in FIG. 2-FIG. 4, the flow channels described above in the testing microchip 2 include the liquid feed control sections 13 which interrupt the passage of liquid until the feed pressure in the normal direction of flow which is from the upstream side to the downstream side reaches a predetermined pressure, and permit passage of the liquid by applying a feed pressure which is greater than or equal to the predetermined pressure.

Figure 7:
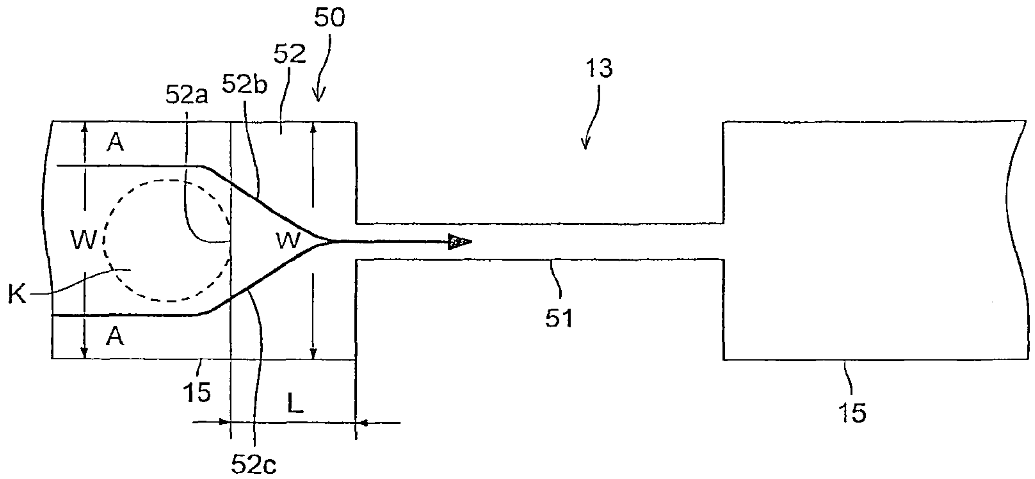
FIG. 7A is a top view of a feed control section 13 of a testing microchip 2 in accordance with the invention.
FIG. 7B is a cross-sectional view of the feed control section 13 in the thickness direction.
Figure 7:
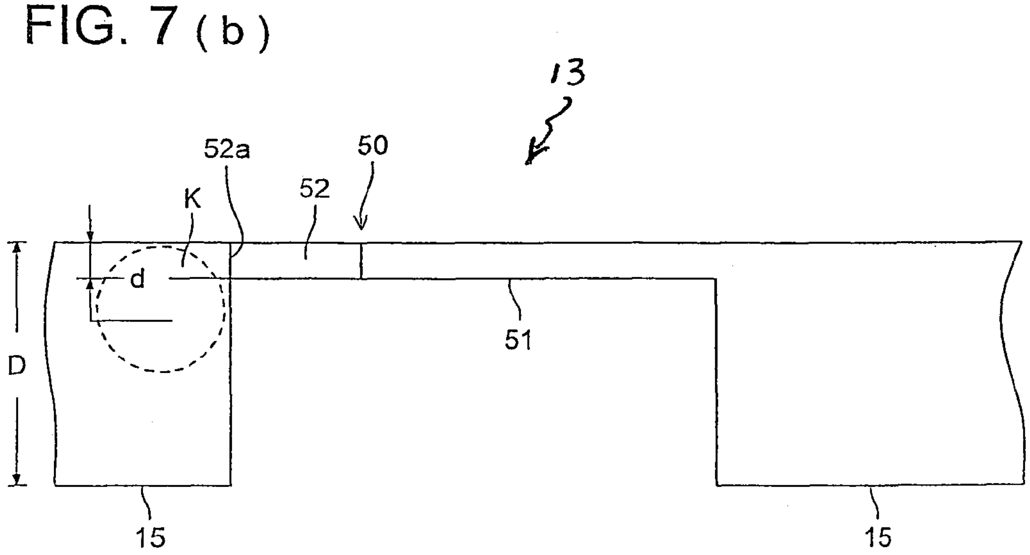

For this reason, in this invention, a liquid feed control section 13 is structured as shown in FIG. 7.

Figure 9:
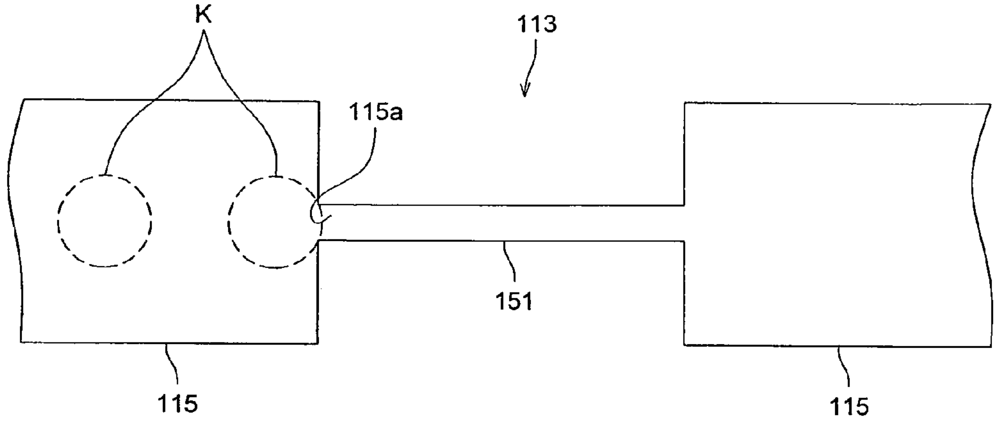
FIG. 9 is a schematic top view showing a feeding state in the liquid feed control section of the known testing microchip.

With such a liquid feed control section 13 in the structure as described in Patent Document 3 (Japanese Patent Application No. 2004-138959), if there are gas bubbles present in the liquid, as shown in FIG. 9, gas bubbles K collect at the flow path entrance 115*a* between the large diameter flow channel 115 and the small diameter feed control path 151, and the flow path entrance 115*a* is blocked.

Accordingly, in order to pass liquid from the upstream flow channel 115 with a large diameter to the downstream flow channel 115 with a large diameter via the small diameter liquid feed control path 151, a micropump pressure that is greater than or equal to a predetermined pressure is needed, and thus accurate feed control cannot be performed.

Thus, there is a possibility that a predetermined testing may not be accurately carried out because the reagent and the specimen, for example, are not be mixed at a suitable time, or they are not mixed in a predetermined mixing ratio and thus do not react with each other.

Also, the gas bubbles K that close the flow path entrance 115*a* sometimes flow all at once from the upstream flow channel 115 with a large diameter to the downstream flow channel 115 with a large diameter via the small diameter feed control path 151, and bonding of the reagent, such as a biotin modified chimera primer for specific hybridization with the gene to be an object of detection, and the specimen is inhibited due to the effect of the gas bubbles and a predetermined testing cannot be performed in the testing section.

For this reason, in this invention, a liquid feed control section 13 is structured as shown in FIG. 7.

That is, the upstream flow channel 15 and the down stream flow channel 15 communicate with each other through the liquid feed control section 13, and the liquid feed control section 13 has a liquid feed control path (a portion with a smaller flow channel diameter) 51 whose flow channel cross-sectional diameter is smaller than that of the flow channels 15, and thus, passing of liquid reaching the feed control path (with the smaller flow channel diameter) 51 from one end side to the other end side is restricted.

As shown in FIG. 7, a gas bubble trapping structure 50 which traps the gas bubbles in the liquid that flow in the flow channels such that they do not flow downstream and allows only liquid to pass, is provided between the upstream flow channel 15 and the feed control path 51.

The gas bubble trapping structure 50 includes a buffer path 52 that has a larger cross-sectional area than that of the liquid feed control path 51.

As shown in FIGS. 7A and 7B, the buffer path 52 is formed so as to have approximately the same width as the upstream flow channel 15 and to have a smaller depth than the depth D of the upstream flow channel 15.

With such a structure for the gas bubble trapping structure, liquid can flow in liquid flow channel 52(*b*) and 52(*c*) (arrow A) at the periphery of the gas bubble K, at both ends in the lateral direction, even when gas bubble K has a large diameter and is present in the liquid in upstream flow channel 15 at the flow path entrance 52(*a*) of the buffer path 52 as shown by the guided lines in FIGS. 7(*a*) and 7(*b*).

Thus, the liquid in the upstream flow channel 15 is flows to the downstream flow channel 15 via the feed control path 51 at a predetermined pressure, and by controlling the pump pressure from the micropump, passing and stopping of the liquid is controlled and feed timing is thereby controlled.

In such a manner, the specimen and the reagent, for example, are mixed at an appropriate time and at a predetermined mixing ratio to react with each other, and predetermined testing can be accurately performed.

Furthermore, because the buffer path 52 has a smaller depth d than the depth D of the upstream flow channel 15, as shown in FIG. 7B, even if the gas bubbles included in the liquid that flows in the upstream flow channel 15 collect at the downstream end of the upstream flow channel 15, trapping of the bubbles at the flow path entrance 52*a* of the buffer path 52 is ensured, and so the gas bubbles never flow into the downstream flow channel 15 with a large diameter.

Accordingly, reaction of the reagent such as the biotin modified chimera primer for specific hybridization with the gene to be an object of detection, and the specimen is not inhibited by the effect of gas bubbles, and thus a predetermined testing can be accurately performed at the testing section.

Herein, considering the gas bubble trapping function described above, the depth d of the buffer path 52 is 0.75D or smaller with respect to the depth D of the upstream flow channel 15, and is preferably smaller than 0.5 D. It is preferable that the depth d of the buffer path 52 is approximately the same as the depth of the downstream feed control path 51.

Further considering the gas trapping function described above, the width w of the buffer path 52 is preferably 0.5 W or larger, and more preferably approximately the same as the width W of the upstream flow channel 15.

Still further considering the gas bubble trapping function described above, the length L of the buffer path 52 should be 1 μm to 5 mm and preferably 10-500 μm.

A preferred embodiment in accordance with the invention has been described above, however, the invention is not limited thereto. For example, although in the above embodiment, an ICAN method is used for the testing microchip for gene screening, various modifications may be made to disposition, shape, dimensions, size and the like, in accordance with the kind of specimen and the testing items provided that they do not depart form the scope of the invention.

What is claimed is:

1. A testing microchip, comprising:

a substrate in which a series of flow channels are formed, the series of flow channel comprising a plurality of flow channels;

a reagent storage section formed in the substrate for storing reagent, the reagent storage section in fluid communication with the series of flow channels for feeding reagents to the series of flow channels;

a specimen storage section formed in the substrate for storing a specimen, the specimen storage section in fluid communication with the series of flow channels for feeding the specimen to the series of flow channels;

a reaction section formed as a section of the series flow channels in the substrate, down stream of the specimen storage section in which a reaction between the specimen and the reagent takes place;

a detection section formed in the substrate and in fluid communication with the series of flow channels downstream of the reaction section, for performing a predetermined test on a reaction product from the reaction section;

a plurality of liquid feed control sections formed in the plurality of flow channels, each one of the liquid feed control sections having a liquid feed control path having a cross sectional flow area smaller than a cross-sectional flow area of the flow channel in which each one of the liquid feed control sections is formed, the cross-sectional flow area of each one of the liquid feed control paths having a width smaller than a width of the cross-sectional flow area of the plurality of flow channels in which the liquid feed control sections are formed and the cross-sectional flow area of each one of the liquid feed control paths having a depth smaller than a depth of the cross-sectional flow area of the plurality of flow channels in which the one of the liquid feed control sections are formed;

a plurality of gas bubble trapping structures formed in the plurality of flow channels, each one of the gas bubbles trapping structures formed upstream of and adjacent to one of the plurality of liquid feed control sections, each one of the gas bubble trapping structures having a buffer path having a cross sectional flow area and said buffer path having a width substantially the same as the width of the cross-sectional flow area of the flow channel in which each one of the gas bubble trapping structures is formed; and said buffer path having a depth smaller than the depth of the cross-sectional area of the flow channel in which each one of the gas bubble trapping structures is formed.

2. The testing microchip of claim 1, wherein the cross-sectional flow area of each buffer path is larger than the cross-sectional flow area of the liquid feed control paths.

3. The testing microchip of claim 1, wherein the specimen storage section comprises a specimen pre-processing section that mixes specimen and a specimen pre-processing liquid and performs a specimen pre-processing.

4. In a test microchip having flow channels, fluid sections and a detection section formed in a substrate, the improvement comprising:

a liquid feed control section formed in one of the flow channels of the microchip, the liquid feed control section allowing liquid flow therethrough and having a liquid feed control path having a cross-sectional flow area smaller than a cross-sectional flow area of said flow channel, the cross-sectional flow area of the liquid feed control path having a width smaller than a width of the cross-sectional flow area of said flow channel and a depth smaller than a depth of the cross-sectional flow area of said flow channel; and a gas bubble trapping structure formed in one of the flow channels of the microchip and positioned in series with, upstream of, and adjacent to the liquid feed control section, the gas bubble trapping structure having a buffer path having a cross-sectional flow area and said buffer path having a width substantially the same as the width of the cross-sectional flow area of said flow channel and a depth smaller than the depth of the cross-sectional flow area of said flow channel.

5. The test microchip of claim 4, wherein the depth of the liquid feed control section equals the depth of the gas bubble trapping structure.

* * * * *